July 7, 1931.  R. CRAIG  1,813,029
MACHINE FOR INDICATING WEIGHT AND FUNCTIONS OF WEIGHT
Filed Jan. 25, 1923  3 Sheets-Sheet 1

Inventor
Robert Craig
By his Attorneys
Cooper, Kerr + Dunham

July 7, 1931.  R. CRAIG  1,813,029
MACHINE FOR INDICATING WEIGHT AND FUNCTIONS OF WEIGHT
Filed Jan. 25, 1923  3 Sheets-Sheet 2
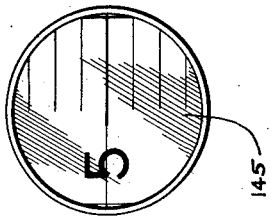
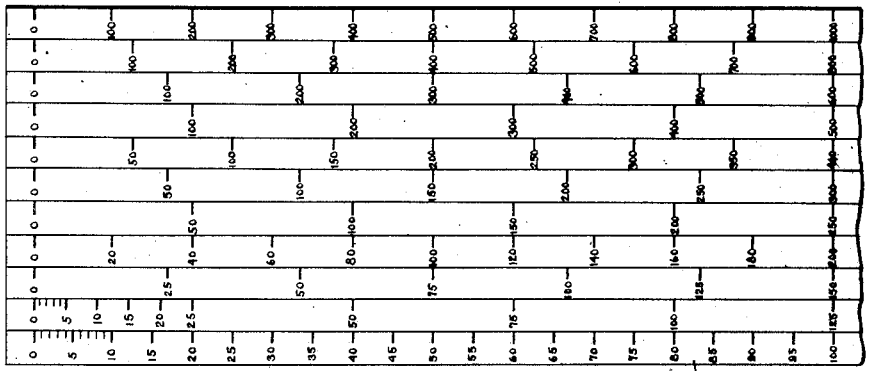
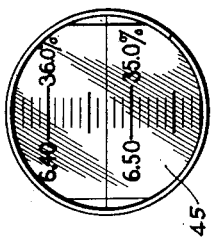
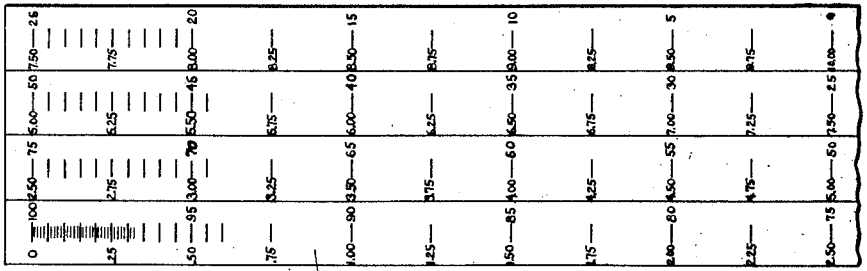
Inventor
Robert Craig
By his Attorneys
Cooper, Kerr & Dunham July 7, 1931. R. CRAIG 1,813,029
MACHINE FOR INDICATING WEIGHT AND FUNCTIONS OF WEIGHT
Filed Jan. 25, 1923 3 Sheets-Sheet 3
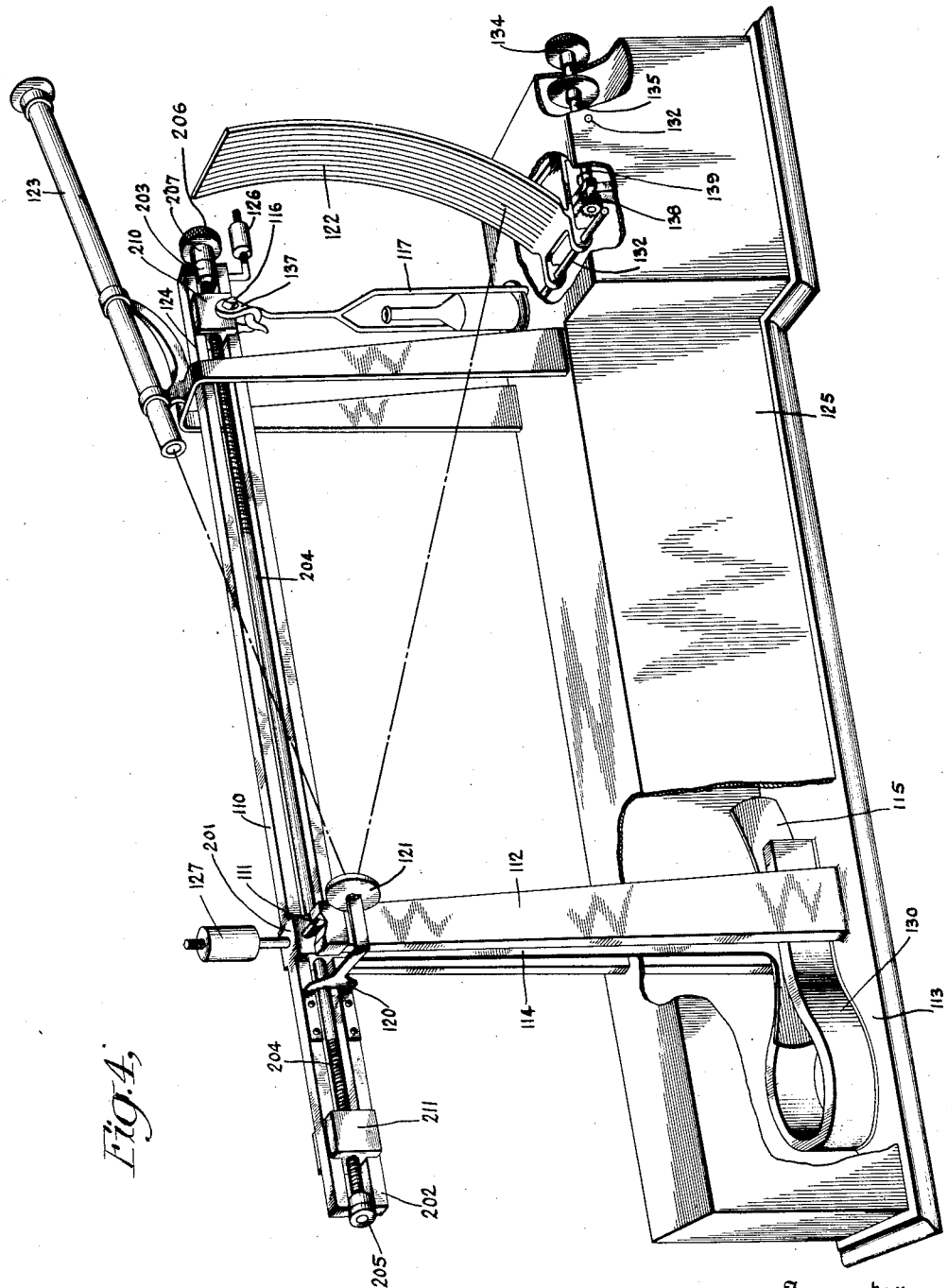

Patented July 7, 1931

1,813,029

UNITED STATES PATENT OFFICE

ROBERT CRAIG, OF DAYTON, OHIO, ASSIGNOR TO INTERNATIONAL BUSINESS MACHINES CORPORATION, OF NEW YORK, N. Y., A CORPORATION OF NEW YORK

MACHINE FOR INDICATING WEIGHT AND FUNCTIONS OF WEIGHT

Application filed January 25, 1923. Serial No. 614,798.

This invention relates to machines for automatically indicating weight or a function or functions of weight.

One of the objects of the invention is to provide a weighing machine comprising a load support, a chart having a plurality of sets of indications whose visibility is selectively and manually controlled, and automatic means for disclosing through a telescope a portion of any selected set of indications in accordance with the weight of a commodity placed upon the load support.

Another object is to provide a novel form of weight-indicating machine.

A further object is to provide a novel machine for automatically indicating the percentage difference in weight of two loads successively placed upon the load support.

A still further object is to provide a novel form of counting machine.

Other objects are to provide machines of the above described classes and types in which there are no racks, pinions, cams, tapes nor dashpots actuated by the weight-actuated mechanism. Further objects and advantages will appear as the inventions are hereinafter disclosed.

Referring to the drawings, which illustrate what I now consider preferred forms of the invention:

Fig. 2 is an elevation of a chart employed in connection with the machine shown in Fig. 1.

Fig. 3 is a diagrammatic view illustrating an image of a portion of one of the sets of indications of the chart shown in Figs. 1 and 2, as viewed through the telescope.

Figs. 4, 5 and 6 are views similar to Figs. 1, 2 and 3, respectively, but illustrating a counting machine or scale.

Figure 1:
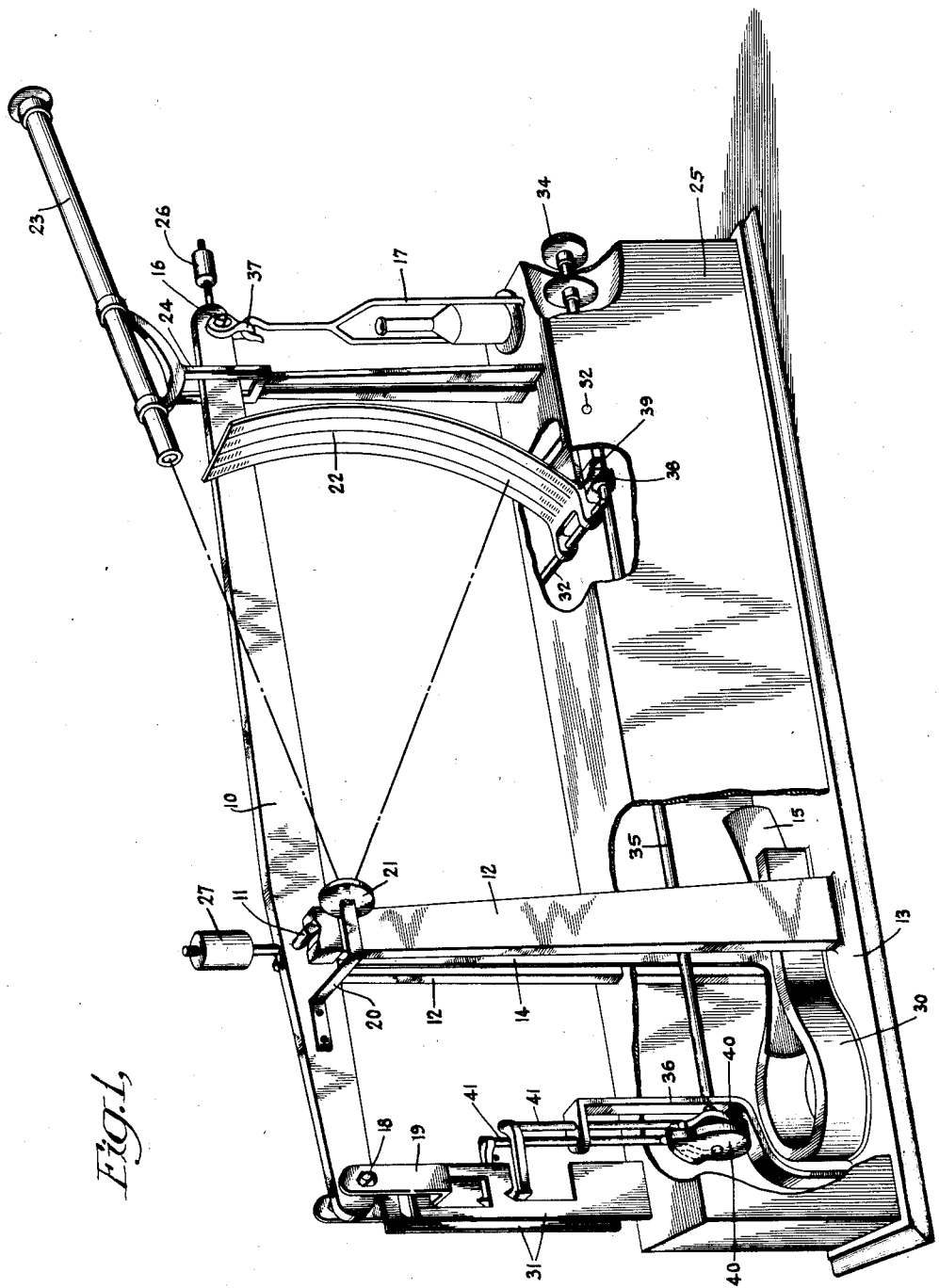
Fig. 1 is a perspective view, with certain parts broken away to reveal other parts, of a machine for indicating weight, or percentage difference in weights, or both.

Referring to Figs. 1 to 3, I shall first describe a machine for automatically indicating weight, or percentage loss of weight or both. This machine comprises a weigh beam 10 fulcrumed by means of knife edge pivot 11 on the standards 12, 12, provided by the base 13. The weigh beam 10 has rigidly secured thereto a pendulum 14 which is preferably formed of a plate of aluminum or other suitable material and is generally in the shape of an inverted T, for a purpose which will hereinafter appear. The weigh beam is also provided with a knife edge nose pivot 16 which supports a stirrup 37, the latter in turn supporting a weigh pan or load support 17. The weigh beam 10 is shown also provided with a knife edge pivot 18 which supports a stirrup 19 adapted to carry one or more capacity weights hereinafter described. I shall now proceed to describe the indicating mechanism of the machine shown in Figs. 1 to 3.

The weigh beam 10 has secured thereto, as by means of a bracket 20, a mirror or other suitable optical device 21. The mounting of the mirror is such that its plane reflecting surface contains the pivotal axis of the pivot 11, or a prolongation thereof. To avoid double images the reflecting surface is that portion of the mirror or reflector 21 which lies nearest the chart 22. The latter is shown in the form of an arc-shaped plate 22 preferably of such shape that its axis coincides with the axis of the pivots 11 and consequently with the axis of oscillation of the reflector 21. The indicia may either be directly engraved, inscribed or otherwise marked upon the member 22 or a paper or other chart may be mounted on the said member 22. The chart 22 is not automatically moved by the load support 17 and I therefore shall refer to it as a fixed chart (and this though it may be manually shifted as will hereinafter appear) to distinguish it from charts which are actuated by or controlled by the load support. Images of the chart 22 are adapted to pass from the chart to the reflector 21 where they are reflected into a reading telescope 23 provided with a cross-hair or index line. The telescope 23 is shown fixed in a bracket 24 secured to the housing 25, in turn secured to the base 13.

The weigh beam 10 may be provided with an adjusting weight 26 and an adjusting weight 27, of which the latter is placed above the axis of the pivot 11 in order adjustably to counterbalance a part of the weight of the pendulum 14. The design and adjustment of parts is preferably such that when there is no load upon the load support and no capacity weight applied to the beam 10, an image of the zero of the chart 22 (which zero is at the upper end of the chart) will appear at the cross-hair or reference line of the telescope 23, and the beam 10 will be above the horizontal by an amount equal to one-half of its total travel, and the pendulum 14 will be vertical. In other words, when the beam 10 is in horizontal position, an image of the middle of the chart will appear at the telescope cross-hair.

If a load is now placed upon the load support 17, the beam 10 and connected parts will assume a new position of equilibrium in accordance with the weight of the load. The chart 22 may therefore be calibrated to read weight. Thus the extreme left hand column of the chart 22 (Fig. 2) is calibrated to read from 0 to 2.5 grams in the specific machine illustrated in Figs. 1 to 3. (For clarity and simplicity of illustration only some of the finer subdivisions of the chart 22 are illustrated.) For the present it will be assumed that the extreme left hand one of the columns or sets of indications of the chart is visible through the telescope 23 and that there are no capacity weights applied. If a load of any weight between 0 and 2.5 grams is placed upon the load support 17, its weight will be correctly and automatically indicated at the cross-hair of the telescope 23 after the beam 10 has come to rest.

In order to damp the oscillations of the weigh beam 10 and to bring the beam and connected parts to the positions of equilibrium quickly, without imposing a friction load upon the same, I prefer to provide a permanent magnet 30 fixed to the base 13 in such position that the member 15 of the pendulum 14 travels between but not in contact with the poles of said magnet 30. By virtue of the magnetic flux passing through the metallic, non-magnetic member 15, eddy currents are induced in the latter whenever and so long as the pendulum is oscillating.

In order to increase the capacity of the weighing scale thus far described the following structure may be provided. A plurality of capacity weights 31, 31, are provided and are each adapted to be suspended upon or raised clear of the stirrup 19. In the present case but two such weights 31 are shown; i. e., a 2.5 gram weight and a 5-gram weight. By applying one or the other or both of these weights to the stirrup 19, capacity weights of 2.5, 5.0, and 7.5 grams may be obtained. Obviously, by increasing the number and variety of capacity weights 31 and selecting various combinations of one, two or more thereof a greater range of applied capacity weights may be attained. The chart 22 is provided with as many sets of weight indications (in addition to the above mentioned extreme left hand set) as there are steps of capacity weights which may be added. Thus in Fig. 2, there are shown four sets or vertical columns of weight indications. These are the first, third, fifth and seventh vertical columns, reading from left to right in Fig. 2. For convenience I shall hereinafter refer to these four sets of indications as the first, second, third and fourth sets, respectively, of weight indications. It will be noted that the first set reads from 0 to 2.5 grams, the second—2.5 to 5.0 grams, the third 5.0 to 7.5 grams, and the fourth—7.5 to 10 grams. The chart 22 is mounted for sliding movement to-and-fro, in a direction parallel to the axis of the pivot 10, by any suitable structure such as spaced parallel rods 32 secured to the casing 25 and upon which the chart 22 is slidably mounted. The design of parts is preferably such that any one, but only one at a time, of the four sets of weight indications may be viewed through the telescope 23. I prefer to provide means for simultaneously applying capacity weight and shifting the chart 22 in accordance with the capacity weight applied, so as to present the proper set of weight indications to the reflector 21. One form of such means is illustrated in Fig. 1 and may be constructed substantially as follows.

A shaft 35 is journaled for rotation in one end of the housing 25 and in a bracket 36 secured to the base 13. That end of the shaft 35 which projects beyond the casing 25 has secured thereto a knob 34 by means of which the shaft may be turned. The shaft has also secured thereto, a pinion 38 which meshes with a rack 39 secured to the chart 22. The shaft 35 has also secured thereto a plurality of cams 40, each adapted to engage and raise a corresponding one of a plurality of rods 41. The cams 40 are of such design, configuration, and are so disposed with relation to each other and with respect to the pinion 38 and chart 22, that when the knob 34 is in its first position the first set of weight indications (0 to 2.5 grams) will be presented to the reflector 21 and both rods 41 and both capacity weights 31 will be in raised position; when the knob 34 is turned clockwise (as viewed from the right of Fig. 1) the second set of weight indications (2.5 to 5.0 grams) will be presented to the reflector 21 and the 2.5 gram capacity weight 31 will be lowered upon the stirrup 19, the other or 5.0 gram capacity weight 31 being still raised and clear of the stirrup 19 (this relative position of parts being indicated in Fig. 1); when the knob 34 is turned further in the same direction, the third set of weight indications (5.0 to 7.5 grams) is presented to the reflector 21 and the 5.0 gram capacity weight 31 is lowered upon the stirrup 19 and the 2.5 gram capacity weight 31 raised clear of the stirrup; and when the knob 34 is turned further in the same direction, the fourth set of weight indications (7.5 to 10.0 grams) is presented to the reflector 21 and both capacity weights 31 are applied to the stirrup 19. At this point I wish to state that, in referring to one of the capacity weights 31 as a 2.5 gram weight and the other as a 5.0 gram weight, I do not mean that these weights are actually of 2.5 and 5.0 gram weight respectively, but rather that the so-called 2.5 gram weight, when suspended from the stirrup 19, will counterbalance a load of 2.5 grams upon the load support 17 and that the 5.0 gram weight will counterbalance a load of 5.0 grams upon the load support 17. The operation of the machine thus far described may be summarized as follows.

Assume that the parts are in such position that the first set of weight indications is presented to the reflector 21 and no capacity weights on the stirrup 19, and it is desired to determine the weight of an article or commodity whose weight lies between 0 and 10 grams. The article is placed upon the load support 17 and a reading taken at the eye-piece of the telescope 23. If the article weighs 2.5 grams or less, its weight will be correctly indicated at the cross-hair of the telescope (the image of the chart being also enlarged). If the article weighs more than 2.5 grams the reading will be off the chart and the operator will then turn the knob 34, simultaneously to apply the 2.5 gram capacity weight to the stirrup 19 and to present the second set of weight indications (2.5 to 5.0 grams) to the reflector 21 (this position of parts being indicated in Fig. 1). If the weight of the article is between 2.5 and 5.0 grams, the weight will be indicated at the cross-hair of the telescope. If the weight of the article exceeds 5.0 grams, the reading will be off the chart and the operator will thus turn the knob 34, simultaneously to remove the 2.5 gram capacity weight 31 from the stirrup 19, and to apply the 5.0 gram capacity weight to the stirrup, and to present the third set of weight indications (5.0 to 7.5 grams) to the reflector 21. If the weight of the article lies between 5.0 and 7.5 grams, the weight will be indicated at the cross-hair of the telescope. Thus, suppose that the weight of the article is 6.47 grams, the reading at the cross-hair 45 of the telescope will be 6.47, as indicated in Fig. 3. If the weight of the article exceeds 7.5 grams, the reading will be off the chart and the operator will turn the knob 34, simultaneously to apply both capacity weights 31 to the stirrup 19 and to present the fourth set of weight indications (7.5 to 10.0 grams) to the reflector 21. The weight of the article will now be indicated at the cross-hair of the telescope. It will be borne in mind that the damper 15—30 quickly brings the beam 10 and connected parts to rest and that, preferably, any one but only one of the four sets of weight-indications may be viewed through the telescope at any one time.

My invention, as thus far described, lends itself admirably to modification in various respects to perform additional or different functions and results. For example, the chart 22 may be so calibrated as to indicate percentage difference in weight. Thus, in Fig. 2, I have illustrated a chart provided not only with the four sets of weight indications above described but also with four sets of percentage indications. The four sets of percentage indications are shown as the second, fourth, sixth and eighth vertical rows of indications, reading from right to left in Fig. 2. These four sets of percentage indications will hereinafter be referred to, respectively, as the first, second, third and fourth sets of percentage indications. Each set is placed to the right of a corresponding one of the four sets of weight indications and the arrangement and calibration are such that any percentage reading at the cross-hair of the telescope 23 will represent the percentage difference in weight between a commodity having a predetermined fixed weight (in the present case—10 grams—the total capacity of the machine) and the weight of the same or a different commodity whose weight is simultaneously indicated with the particular percentage reading at the telescope cross-hair. Thus, the fourth set of percentage indications runs from 0 (at the 10 gram mark of the fourth set of weight indications) to 25%; the third set runs from 25% to 50%; the second set runs from 50% to 75%; and the first set from 75% to 100%. The operation of this form of the invention may now be described as follows.

Assume that it is desired to determine the percentage of moisture in a commodity such as butter. 10 grams of the butter are weighed out on the load support 17 in the manner previously described. This 10 grams of butter is then baked, fried or otherwise treated to evaporate or remove the moisture. The butter is then placed upon the load support and weighed as previously described. A reading not only of weight but also of % difference in weight, i. e., percentage of moisture content may also be directly taken at the cross-hair of the telescope 23. To explain more fully—assume that 10 grams of butter have been weighed out, treated to remove the moisture, and then placed upon the load support 17. Assume further that the weight of the butter, with the moisture removed, is 6.47 grams. The reading at the cross-hair 45 of the telescope (see Fig. 3) would then be 6.47 grams and 35.3%. The difference in weight of the butter before and after removal of the moisture is 10.0 minus 6.47 which is equal to 3.53 grams—the weight of the moisture removed. Dividing 3.53 grams by 10 grams and multiplying by 100, the result is 35.3 percent, and this percentage is automatically indicated at the cross-hair 45. Similarly any percentage loss of weight between 0 and 100 may be directly read at the cross-hair 45 without any calculation on the part of the operator.

If it is desired to employ the machine to indicate only percentage difference or loss in weight, the weight indications (the first, third, fifth and seventh columns shown in Fig. 22) may be omitted from the chart. In this case such an amount of butter would be placed upon the load support 17 as would cause the reading at the cross-hair to be 0%. This butter would then be treated to remove the moisture and then again placed upon the load support 17 and a direct reading of percentage taken at the cross-hair 45. It will be understood that the machine last described may be employed in ore testing and other arts. For example, in ore testing, 10 grams of ore may be weighed out on the machine, then treated to remove a certain desired constituent, and then placed upon the load support 17 and a direct reading of percentage taken. This reading would indicate the percentage of constituent removed to the ore originally weighed out.

In describing the arrangement of the sets of weight indications, it was stated that any one but preferably only one at a time of the four sets of such indications may be viewed through the telescope. The sets of percentage indications are similarly arranged; i. e., any one, but preferably only one at a time, of the four sets of percentage indications may be viewed through the telescope. Thus, in Fig. 3, the third set of weight indications and the third set of percentage indications are visible but none of the other sets are visible at this time.

In Figs. 4, 5 and 6 I have illustrated a form of counting machine or scale. The machine illustrated in Figs. 4, 5 and 6 is quite similar to that illustrated in Figs. 1, 2 and 3 in structure and general operation. To avoid surplusage in description, I have indicated those of the elements shown in Fig. 4, which correspond with elements shown in Fig. 1, by such reference numerals that any element designated by a reference numeral between 110 and 199 in Fig. 4, corresponds to the part designated by the same number less 100, in Fig. 1. It will be noted that the capacity weights 31, pivot 18, rods 41, cams 40, bracket 36, and that portion of the shaft 35 which lies to the left of pinion 38, all as shown in Fig. 1 are omitted in Fig. 4. It will also be noted that the weigh beam 110 and certain of its connected parts, and the chart 122 as shown in Fig. 4, differ from the generally corresponding elements as shown in Fig. 1, in respects which I shall now proceed to describe.

Referring to Fig. 4, it will be seen that the beam 111 is provided with an enlarged portion 201 to which the pivots 111 are secured. This portion 201 and the enlarged portions 202 and 203 serve as bearings or journals in which a rod 204 is rotatably mounted. While the rod 204 is rotatable with respect to the beam 110 it is constrained against sliding movement with respect to the beam by means of a collar or nut 205, secured to one end of said rod 204, and a nut or knob 206 secured to the other end of said rod and having a hub or washer 207 interposed between said knob and the end of the beam 110. The bracket 120 differs slightly in form from the bracket 20 but the reflector or optical element is supported in the same position with respect to the axis of the pivot 111 as the reflector 21 is located with respect to the axis of the pivots 11. The elements 127, 126 and 114 provided on the beam 110 need no further description in view of the description of the corresponding elements 27, 26 and 114 provided on the beam 10. The pivots 116 which support the stirrup 137 and load support 117 are not directly connected to the beam 110 but are shown rigidly secured to opposite sides of a block 210 which is slidably but non-rotatably mounted on the beam 110, as clearly shown in Fig. 4. The block 210 is internally threaded to receive and cooperate with the threads provided on the right hand end of the rod 204 so that rotation of the knob 206 in one direction or the other will cause the block 210 to move to the right or left on the beam 110, depending on the direction of rotation of the said knob 206. In other words, the elements 204, 206, 210 form a means whereby the lever arm of the applied load may be varied at will for a purpose which will hereinafter appear.

Means, such as a counterbalance weight 211 slidable on the beam 110, are provided for preserving the zero balance when the pivots 116 are moved as above described. To minimize the manual operations required to preserve the "zero balance" when the lever arm of the applied load is changed, I prefer to operate the counterbalance 211 by the same manually operable element 206 employed to shift the nose pivots 116. Thus I have shown the left hand end of the rod 204 provided with screw threads, the screw threads at one end of said rod 204 being right-handed and those at the opposite end, left-handed. The design of parts is such that any turning movement of the knob 206 to shift the pivots 116 will impart such movement to the counterbalance 211 that the zero position of the beam 110 will be maintained. In other words, when the weigh pan or load support 117 is empty, the equilibrium position of the beam 110 will be unchanged by rotation of the knob to shift the pivots 116.

Referring now to the extreme left-hand vertical column of indications in Fig. 5, it will be seen that the uppermost reading is zero and the lowermost is 100. Assuming for the present that the parts are so adjusted that the block 210 is midway of its travel on the threads at the right-hand end of the rod 204, that the extreme left-hand (Fig. 5) or first set of indications of the chart 122 are presented to the mirror 121, and that the design of the machine is such that a weight of 2.5 grams placed upon the load support 117 will cause the reading at the cross-hair of the telescope to be "100", let us assume that it is desired to count or find the total number of a lot of articles each of the same weight as any of the others of the lot. A predetermined number, say 100, of the articles are placed upon the load support 117, and a reading taken at the telescope. If the reading is exactly "100" the machine is in adjustment for counting that particular lot of articles and the "100" articles on the load support may now be removed. Successive quantities, each of unknown numbers of the same lot of articles, may now be placed upon the load support 117 and a direct reading of the number of articles in each such quantity taken at the telescope cross-hair 145. It will be understood of course that, under the conditions assumed and with the particular machine above described, each quantity counted should not be so large as to throw the reading off the chart.

If the predetermined number, assumed above to be 100, or articles first placed upon the load support 117 causes a reading of less than "100" at the telescope cross-hair 145, the knob 206 is turned to move the block 210 away from the pivot 111 until the reading at the cross-hair 145 is "100". The counting may then be proceeded with as above described. If, on the other hand, the predetermined number—100—of articles first placed upon the load support 117 causes the reading at the telescope to be beyond "100", the knob 206 is turned to move the block 210 toward the pivot 111 until the reading at the cross-hair 145 is "100". The counting may then be proceeded with as above described.

I wish to call attention to the fact that the "zero balance" of the counting machine is not disturbed by the shifting of the block 210 as above described. In other words, whenever the weigh pan or load support 117 is empty, the reading at the telescope cross-hair 145 will be zero. Preferably, the design is such that the position of "zero balance" of the beam 110 is the same as that of the beam 10 described in connection with Fig. 1. It will be noted also that my counting scale does not require the maintenance of a predetermined number of articles on an auxiliary load support while the automatic counting is being carried on.

While the counting machine thus far described is a vast improvement over those heretofore devised and may be usefully employed without mechanism other than that above described, I prefer to provide means for minimizing the adjustment of the block 210—the beam 110 and for increasing the range of utility of the machine. To effect these results, I provide, instead of a single set of indications, a plurality of sets of indications such, for example, as those shown in Fig. 5.

Referring to Fig. 5, it will be seen that I have shown eleven vertical columns or sets of indications which I shall hereinafter refer to as the first, second, third, etc., sets of counting indications—reading from left to right. It will be noted that the first set reads from 0 to 100; the second, 0 to 125; the third, 0 to 150; the fourth, 0-200; the fifth, 0-250; the sixth, 0-300; the seventh, 0-400; the eighth, 0-500; the ninth, 0-600; the tenth, 0-800; and the eleventh, 0-1000. For the sake of clarity in illustration and to avoid surplusage, I have shown the unit calibrations only at the upper ends of the first and second sets of indications in Fig. 5. It will be further understood that while I have shown eleven sets of counting indications, a greater or less number may be provided if desired. The design is such that by turning the knob 134 any of the eleven sets of counting indications of the chart 122 may be presented to the reflector 121 and viewed in the telescope 123 but, preferably, when the full width of any one of these sets is visible through the telescope, no other set will be visible therethrough at the same time.

The operation of the counting machine may now be briefly summarized as follows. Place in the weigh pan 117 a known number, say 100, of the lot of articles to be counted. Then, by turning the knob 134 move the chart 122 until that column is found in which the telescope cross-hair 145 most nearly corresponds with the "100" mark. Then adjust the nose pivot 116 (by turning the knob 206) until the cross-hair 145 exactly coincides with the "100" mark. Then, with that adjustment, the 100 articles (test load) may be removed from the load support 117 and successive quantities, each of unknown numbers of the same lot of articles, may be placed upon the load support and a direct reading of the number of articles in each such quantity taken at the telescope cross-hair 145, without further adjustment or calculation. With the chart 122 calibrated as shown in Fig. 5, any quantity of articles up to 1000 may be placed upon the load support and the number of articles in that quantity will be automatically indicated at the telescope cross-hair. Thus—the reading shown in Fig. 6 is "5", indicating that there are five articles upon the load support 117.

It will now be appreciated that I have provided a counting scale or machine which is more nearly automatic than any heretofore employed or devised and which does not employ any auxiliary load support.

The machine shown in Figs. 4, 5 and 6 may be modified in various respects, other than or in addition to those above mentioned, without departing from the scope of the invention as defined in some of the appended claims.

While the images of the chart might be projected from the reflector 121 upon a suitable screen, as disclosed in my copending application, Serial No. 386,453, I have, to avoid surplusage in disclosure, restricted the present illustration to the use of a telescope.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is—

1. An automatic scale comprising in combination, a load support, a chart having a plurality of sets of indications, a telescope, manually operable means for selectively controlling the visibility of said sets of indications through said telescope, and means controlled by said load support for distinctively disclosing through said telescope a portion of any selected set of said indications in accordance with the weight of a commodity.

2. A counting scale comprising in combination, a load support and counter-balancing means therefor, indicating means controlled by said load support, and means settable in accordance with the known number of articles of equal weight in a test load upon said load support for causing said indicating means automatically to indicate the number of articles in an unknown quantity of articles each of the same weight as each of the articles of the test load.

3. The combination set forth in claim 2 in which the settable means comprises devices for varying the relationship of the forces exerted by an applied load and the counterbalancing means.

4. The combination set forth in claim 2 in which the indicating means comprises a plurality of differently calibrated sets of indications.

5. The combination set forth in claim 2 in which the indicating means comprises a plurality of differently calibrated sets of indications, and in which the settable means comprises devices for selecting any one of said sets of indications.

6. The combination set forth in claim 2 in which the indicating means comprises a plurality of differently calibrated sets of indications, and in which the settable means comprises devices for selecting any one of said sets of indications and devices for varying the relationship of the forces exerted by an applied load and the counter-balancing means.

7. A counting scale comprising in combination, a weigh beam, a load support connected to said beam, load-offsetting means connected to said beam, indicating means controlled by said weigh beam, and means settable in accordance with the known number of articles of equal weight in a test load upon said load support for causing said indicating means automatically to indicate the number of articles in an unknown quantity of articles each of the same weight as each of the articles of the test load.

8. The combination set forth in claim 7 in which the load-offsetting means comprises a pendulum.

9. The combination set forth in claim 7 in which the settable means includes devices for varying the relationship of the moments of the load and the load-offsetting means.

10. The combination set forth in claim 7 in which the settable means includes devices for varying the relationship of the moments of the load and the load-offsetting means without changing the no-load position of the weigh beam.

11. The combination set forth in claim 7 in which the settable means includes devices for varying the lever arm of the applied load.

12. The combinaton set forth in claim 7 in which the settable means includes devices for varying the lever arm of the applied load without changing the no-load position of the weigh beam.

13. A counting scale for counting articles and comprising in combination; a weigh beam; a load support connected to said beam; load-offsetting means connected to said beam; indicating means controlled by said beam; and settable means, including devices for varying the relationship of the moments of an applied load and said load-offsetting means with respect to each other in accordance with a test load without changing the no-load position of said beam, for causing said indicating means to indicate the number of articles in any of various quantities of articles of unknown number placed upon said load support.

14. An automatic counting scale comprising in combination, a load support, a chart having a plurality of differently calibrated sets of indications, manually operable means for selectively controlling the visibility of said sets of indications in accordance with the weight of a predetermined number of articles in a lot of articles of unknown number but of articles each of the same weight as any other article in that lot, and means controlled by said load support for distinctively disclosing that portion of any selected set of said indications which indicates the number of such articles in a quantity of unknown number placed upon said load support.

15. An automatic counting scale comprising in combination, a load support, a chart having a plurality of differently calibrated sets of indications, manually operable means for selectively controlling the visibility of said sets of indications in accordance with the weight of a predetermined number of articles in a lot of articles of unknown number but of articles each of the same weight as any other article in that lot, and means including a reflector controlled by said load support for distinctively disclosing that portion of any selected set of said indications which indicates the number of such articles in a quantity of unknown number placed upon said load support.

16. The combination set forth in claim 14 provided with means operative only upon movement of the reflector for damping oscillations of the reflector.

17. An automatic counting scale comprising in combination, a stationary chart, means comprising a movable optical device for projecting an image of said chart, means adapted to receive a quantity of articles to be counted, and means controlled by said last mentioned means and operative upon said first mentioned means for producing an indication of the number of articles on said second mentioned means.

18. The combination set forth in claim 17 provided with means operative only upon movement of said optical device for damping oscillations of said device.

19. The combination set forth in claim 3 in which means are provided for generating eddy currents to bring the parts to rest quickly.

20. An automatic scale as set forth in claim 1 in which the chart is curved in the direction in which each set of indications extends.

21. An automatic scale as set forth in claim 1 in which the chart is opaque and is curved in the direction in which each set of said indications extends.

22. An automatic counting scale comprising in combination, a stationary chart, means comprising a movable optical device for projecting an image of said chart, a load support adapted to receive the articles to be counted, and means controlled by said load support and operative upon said first mentioned means for producing an indication of the number of articles on said load support.

23. The combination set forth in claim 22 provided with means operative only upon movement of said optical device for damping oscillations of said device.

24. The method of counting articles of equal weight which comprises counterbalancing the weight of a known number of such articles by counterbalancing means adapted to assume a position proportional to a load, relatively adjusting the moments of the applied load and the counterbalancing means in accordance with the weight of the known quantity of such articles to cause the counterbalancing means to assume a predetermined position corresponding to such weight, and replacing the known number of such articles with quantities of unknown number of such articles.

25. The method of counting articles of equal weight which comprises counterbalancing the weight of a known number of such articles by counterbalancing means which automatically brings about a movement proportional to the moment of the applied load, relatively adjusting the moments of the applied load and the counterbalancing means in accordance with the weight of the known quantity of such articles to cause the counterbalancing means to assume a predetermined position corresponding to such weight, replacing the known number of such articles with quantities of unknown numbers of such articles, and indicating the movement of the counterbalancing means.

In testimony whereof I hereto affix my signature.

ROBERT CRAIG.